United States Patent
Torok et al.

(10) Patent No.: US 6,354,536 B1
(45) Date of Patent: Mar. 12, 2002

(54) ROTOR HUB MOUNTED ACTUATOR FOR CONTROLLING A BLADE ON A ROTORCRAFT

(75) Inventors: Michael S. Torok, Hamden; William A. Welsh, North Haven, both of CT (US); George Gustave Zipfel, Jr., Summit, NJ (US); Gregory Weston Terpay, Whippany, NJ (US); Ka-Shu Lee, Rockaway, NJ (US); William Edward Vanderbeck, Kinnelon, NJ (US)

(73) Assignee: Sikorsky Aircraft Corporation, Stratford, CT (US)

( * ) Notice: Subject to any disclaimer, the term of this patent is extended or adjusted under 35 U.S.C. 154(b) by 25 days.

(21) Appl. No.: 09/634,959

(22) Filed: Aug. 8, 2000

(51) Int. Cl.[7] .......................... B64C 27/32; B64C 27/64
(52) U.S. Cl. ............................. 244/39; 416/24; 416/117
(58) Field of Search ............................. 244/7 A, 17.27, 244/39, 226; 416/23, 24, 117, 148

(56) References Cited

U.S. PATENT DOCUMENTS

| | | | |
|---|---|---|---|
| 2,672,202 A | * 3/1954 | Pullin et al. | 416/117 |
| 4,324,530 A | 4/1982 | Fradenburgh et al. | 416/228 |
| 4,379,678 A | * 4/1983 | Carlock et al. | 406/98 |
| 5,588,800 A | 12/1996 | Charles et al. | 416/24 |
| 5,639,215 A | 6/1997 | Yamakawa et al. | 416/23 |
| 5,711,651 A | 1/1998 | Charles et al. | 416/24 |

OTHER PUBLICATIONS

Miao et al., "Flight Demonstration of Higher Harmonic Control (HHC) on S–76," presented at the 42nd Annual Forum of the American Helicopter Society, Washington, D.C., Jun. 2–4, 1986.

Dawson et al., "Wind Tunnel Test of an Active Flap Rotor: BVI Nose and Vibration Reduction," presented at the American Helicopter Society 51st Annual Forum, May 9–11, 1995, Forth Worth, Texas.

Charles et al., "Higher Harmonic Actuation of Trailing–Edge Flaps for Rotor BVI Noise Control," Presented at the 52nd Annual Forum of the American Helicopter Society, Washington, DC, Jun. 4–6, 1996.

Press Release from Diversified Technologies entitled "Electromagnetic Acutator For Vibration And Acoustic Control," undated.

Article entitled, "Individual Blade Control Project", undated (http://halfdome.arc.nasa.gov/~aarweb/research/ibc.html) (undated).

Ormiston et al., "Aeroelastic and Dynamic Rotor Response with On–Blade Elevon Control," Proceedings of the 24th European Rotorcraft Forum, Marseilles, France, Sep. 15–17, 1998.

Fulton et al.,"Hover Testing of a Small–Scale Rotor with On–Blade Elevons," Proceedings of the 53rd Annual forum of the American Helicopter Society, Virginia Beach, Virginia, Apr. 29–May 1, 1997.

* cited by examiner

Primary Examiner—Robert P. Swiatek

(57) ABSTRACT

A hub mounted actuation system for providing control of a portion of a rotor blade, such as a flap, on a rotorcraft. The rotor blade is attached to a rotor shaft that rotates with respect to an airframe. The hub mounted actuation system includes a stationary support mounted to the airframe and a rotary support attached to the rotor shaft for concomitant rotation therewith. At least one hub actuator rotates in combination with the rotor blade and includes a piston which is slidable within a housing. The piston and housing define a pressure chamber within the actuator which contains a fluid to be pressurized. A displacement control device is disposed between the stationary support and the rotary support for controlling movement of the piston within the housing. A linkage connects the hub actuator to the portion of the blade to be controlled. The linkage is adapted to displace the blade portion as a function of the movement of the piston within the housing.

17 Claims, 11 Drawing Sheets

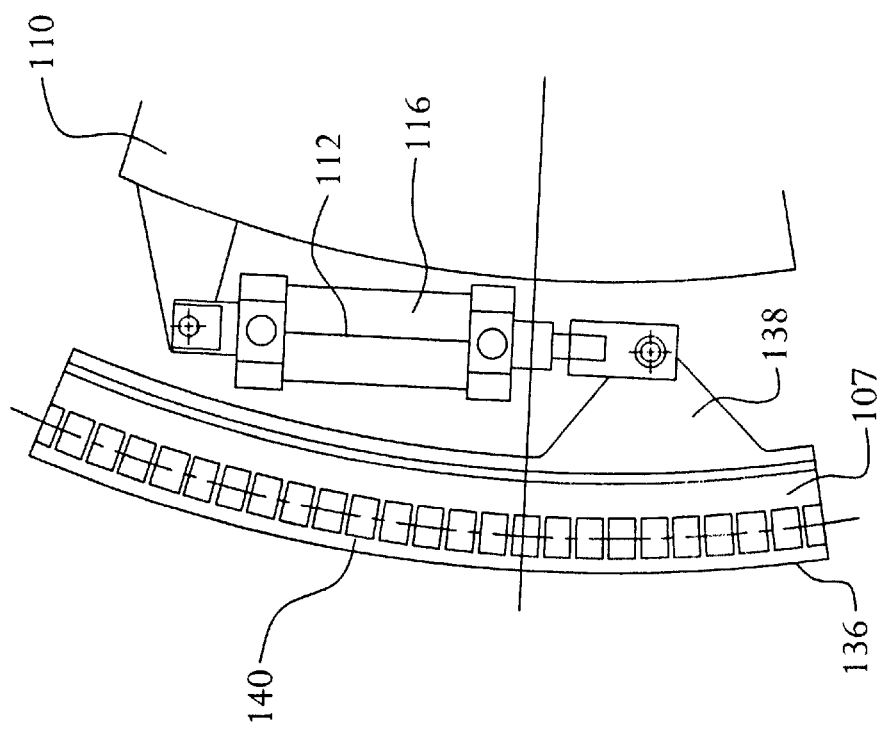

ROTOR HUB MOUNTED ACTUATOR FOR CONTROLLING A BLADE ON A ROTORCRAFT

The Government has rights to the invention pursuant to government contract N00019-96-C-2079 awarded by the United States Naval Research Laboratory.

RELATED APPLICATION

This application is related to a co-pending application entitled "Permanent Magnet Phase-Control Motor", Ser. No. 09/624,554 filed concurrently herewith, which application is incorporated herein by reference in its entirety.

FIELD OF THE INVENTION

The present invention relates to an actuator for a rotor blade on a rotorcraft and, more particularly, to a hub mounted actuator for controlling the position of a rotor blade or a flap attached thereon.

BACKGROUND OF THE INVENTION

A rotor system on a rotorcraft includes a rotor head mounted on a rotating shaft. The rotor head connects to rotor blades that are individually pivotable about a feathering axis to control the aircraft flight. In conventional rotorcraft, the pivoting or pitch of the blade, as well as the orientation of the rotor tip-path plane (the plane of the rotor blade tips)with respect to the shaft, are controlled using a mechanical linkage arrangement that typically includes a swashplate which is connected to the rotor blades with control or push rods. The swashplate includes a rotating portion that supports the control rods and is linked to the rotor shaft through a scissor linkage. As the swashplate is a rigid or near rigid member, the motion that can be transmitted to the blades is limited. The swashplate also includes a non-rotating portion which is attached to the rotating portion through a bearing. The non-rotating swashplate is moved by the primary control actuators, to simultaneously vary the pitch of all of the rotor blades. For conventional helicopters, the primary control actuators are low bandwidth and, thus, actuation is limited to steady or once per rev (1P) on the rotor. Inclusion of higher bandwidth primary actuators expands this range, but there remains a physical limitation that the rotor blades can only be practically actuated at N−1, N and N+1 per rev, where N is the number of rotor blades resulting from the primary actuators being actuated at N per rev. Actuation at these higher frequencies has been accomplished and is referred to as Higher Harmonic Control (HHC).

There are times, however, when it is desirable to control blade motions at a frequency other than the frequencies allowed by conventional trim control or HHC control. The capability of controlling rotor motion at multiple and arbitrary frequencies can yield significant benefits in rotor performance and load factor capability. Rotor blade control at these frequencies can also be used to reduce aircraft vibrations and externally radiated noise.

For example, helicopter main rotor lift and rotor driving torque produce reaction forces and moments on the helicopter main gearbox. In addition to these primary flight loads, the aircraft is also subjected to vibratory loads originating from the main rotor system. These vibratory loads produce vibrations within the aircraft that are extremely bothersome and fatiguing to the passengers. The vibratory loads on the main rotor are generated from the passage of the rotor blades through their own complex wake structure. Unlike a fixed wing aircraft where the wing wake trails harmlessly behind the aircraft, a helicopter wing or blade, due to the rotation of the rotor, must pass through its own wake repeatedly and in a manner dependent on, among other things, the weight of the helicopter and its forward speed. Unsteadiness and spatial variations in the incident air flows yield vibratory loads on the blade that, when integrated into the rotor hub, result in vibratory loads which are then transmitted into the airframe cockpit and cabin. The frequency content of these vibratory loads is dominated by multiples of the number of blades (i. e. for a 4-bladed helicopter, the principle frequency is 4 times the rotor speed-additional but smaller contributions are multiples of this, e.g. 8 times rotor speed, 12 times rotor speed, etc.)

In addition to vibration, the interaction of the rotor blades with blade vortices developed by the preceding blades during rotation generates external noise. As the rotor blade rotates, the changing distribution of lift along the blade and over time results in trailed and shed vortices (concentrated rotational air flow). During normal flight modes, these blade vortices do not cause any particular problem. However, in certain instances, for example when the aircraft is descending in an approach, the following blades come into proximity to these blade vortices generating an impulsive noise or slap. These blade-vortex interactions (BVI) produce an external noise signature which can be easily detected at long range, increasing the aircraft's vulnerability when in a hostile environment, and for commercial applications, becomes a community annoyance.

Many attempts have been made over the years to alleviate or reduce blade vortex interactions. A considerable amount of those attempts have been directed toward passive type systems wherein the blade is designed to weaken the vortex at the blade tip. See, for example, U.S. Pat. No. 4,324,530 which discloses a rotor blade with an anhedral swept tapered tip which reduces the intensity and shifts the location of the tip trailing edge vortex so as to reduce the occurrence of blade vortex interactions and improve blade performance.

While passive solutions have provided some reduction in blade vortex interaction, these types of solutions are near their limits in terms of noise reduction benefits. In order to meet more stringent military and commercial requirements, alternate solutions need to be considered.

Active rotor control systems have recently been proposed to counteract blade vortex interactions. These systems are typically designed to change the motion of the rotor blade and the trailed vortices to increase the distance between them so as to reduce the magnitude of the interaction and thus to reduce the level of generated noise. One of these systems is called higher harmonic blade pitch control (HHC, as mentioned previously) wherein the blade pitch is controlled to maximize the miss distance between the blades and the trailed vortices. This type of system was originally developed to address rotor induced vibration. Results to date have shown success at reducing both vibration and noise, independently. The limitation in allowable rotor blade motions, however, has kept researchers from achieving benefits in both noise and vibration simultaneously. In contrast, results have shown that improved vibration solutions generally increase noise levels and vice-versa. Other major concerns are the high loads imparted to the blades due to inertial loads generated by moving the entire blade as well as the high levels of primary actuation power needed to control the blade motions. An additional problem is the potential for excessive wear occurring on the flight critical primary actuator seals.

Another active control system is discussed in U.S. Pat. No. 5,588,800. This active control system is mounted within a helicopter rotor blade and includes actuatable flaps on the rotor that are controlled to reduce the blade vortex interaction. An actuator is used to control the movement of the flaps and can be either mechanical, electrical, pneumatic, or hydraulic. While U.S. Pat. No. 5,588,800 states that the blades are actuated according to a prescribed schedule to reduce the development of BVI, there is no discussion in U.S. Pat. No. 5,588,800 about how such control is provided (i.e., the type of system used to actuate the flap).

U.S. Pat. No. 5,639,215 discloses a similar actuatable flap assembly. In this assembly, the actuator is a mechanical actuator that is either a push-rod type device, a linkage, or a servo-motor driven rack. As with U.S. Pat. Nos. 5,588,800, 5,639,215 does not disclose the type of system is used to control the actuator.

Alternate types of systems are currently being investigated for actively controlling a rotor blade, including piezo-electric patches, piezofiber composites, PMN stacks (i.e., a series of piezo-electric wafers stacked up with varying orientation), and magneto-strictive stacks (i.e., stacks of Terfenol rods, for example, encased in magnetic coils which produce a magnetic force that elongates the Terfenol rods). These devices (also known as smart materials) are extremely displacement limited and thus require complex displacement magnification schemes. In sum, this results in a very heavy solution.

Although the prior art systems for actively controlling the rotor blade interactions with the blade vortex are empirically better than passive systems, these prior art systems do not adequately address the realistic problem associated with controlling a flap or rotor blade at a frequency other than the rotational speed of the rotor shaft.

Another issue with systems for controlling blade actuation is the need to transmit power to the rotating blade actuation system. For example, if a hydraulic, pneumatic or electrical actuation system is mounted on the rotating rotor hub, then power must be transmitted from the aircraft through some means, (e.g., a slip ring) to the rotating hub. Slip rings, however are a wear item and suffer reliability and maintainability issues. In addition, the size of such devices make integration into the rotor hub and transmission design quite difficult.

One prior art system for controlling the actuation of a rotor blade was developed by ZF Luftfahrttechnik, and EuroCopter Deutschland and tested on the BO-105 helicopter. In this system, the conventional blade pitch control rods were replaced with servo-actuators which allowed the pitch of each blade to be independently controlled in a range of between 2/rev to 6/rev. There are several drawbacks to this system. First, moving the blade at the root requires a high force and, thus, is not efficient. Also, the servo-actuator in this system is a flight critical component and requires an auxiliary hydraulic pump with a large flow rate to accommodate the high force required. In addition, the need for a hydraulic slip ring brings both weight, complexity and reliability and maintainability issues to the system.

A need, therefore, exists for an improved actively controlled blade actuation system for controlling blade pitch or flap changes.

SUMMARY OF THE INVENTION

The present invention relates to a hub mounted actuation system for providing control of a portion of a rotor blade, such as a flap, on a rotorcraft. The rotor blade is attached to a rotor hub and shaft that rotates with respect to an airframe. The hub mounted actuation system includes a stationary support mounted to the airframe and a rotary support attached to the rotor hub for concomitant rotation with the rotor shaft.

At least one hub actuator rotates in combination with the rotor blade and includes a piston which is slidable within a housing. The piston and housing define a pressure chamber within the actuator which contains a fluid to be pressurized.

Displacement control means is disposed between the stationary support and the rotary support for controlling movement of the piston within the housing. A portion of the displacement control means is attached to the stationary support and a portion is attached to the hub actuator.

A linkage connects the hub actuator to the portion of the blade to be controlled. The linkage is adapted to displace the blade portion as a function of the movement of the piston within the housing.

In one embodiment of the invention, the displacement control means includes a stator mounted to the stationary support, and an intermediate member supported by and rotatable relative to the rotary support. One of either the piston or the housing is attached to the intermediate member and the other is attached to the rotary support. The intermediate member has a plurality of magnets spaced around its circumference adjacent to the stator on the stationary support such that when current is supplied to the stator a magnetic field is created that causes the intermediate member to rotate relative to the rotary support. Rotation of the intermediate member relative to the rotary support causes the piston to move within the housing.

In another embodiment of the invention, the displacement control means includes a deformable cam mounted between the stationary support and the rotary support. The deformable cam is supported by cam actuators mounted to the stationary support. The cam actuators are adapted to deform the cam as commanded. A cam follower is in rolling contact with the deformable cam and attached to the piston of the hub actuator. As the cam follower rolls around the cam, the deformation of the cam causes the piston to move within the housing of the hub actuator.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 6 is a top view of a portion of an intermediate ring showing its attachment to an inner ring with an actuator.

FIGS. 12 and 12A illustrate a variation of the deformable cam embodiment.

DETAILED DESCRIPTION OF THE PREFERRED EMBODIMENTS

While the invention will be described in connection with one or more preferred embodiments, it will be understood that it is not intended to limit the invention to those embodiments. On the contrary, it is intended that the invention cover all alternatives, modifications and equivalents as may be included within its spirit and scope as defined by the appended claims.

Certain terminology is used herein for convenience only and is not to be taken as a limitation on the invention. For example, words such as "upper," "lower," "left," "right," "horizontal," "vertical," "upward," and "downward" merely describe the configuration shown in the figures. Indeed, the components may be oriented in any direction and the terminology, therefore, should be understood as encompassing such variations unless specified otherwise.

Figure 1:
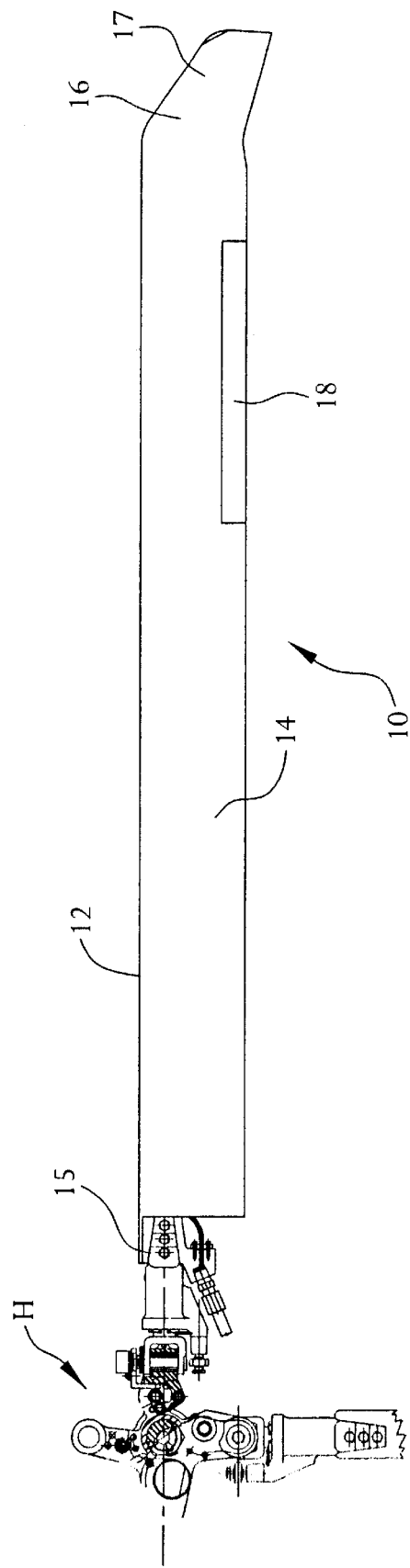
FIG. 1 is a plan view of a helicopter rotor blade incorporating an actuatable flap according to one embodiment of the present invention.

Referring now to the drawings, wherein like reference numerals illustrate corresponding or similar elements throughout the several views, the present invention is illustrated as it is contemplated for use in a flap actuation system on a helicopter rotor blade. However, the present invention is not limited to such an embodiment. For example, the present invention can be used to provide blade pitch control in various types of rotorcraft and by various means. FIG. 1 illustrates a rotor blade 10 for a helicopter. The rotor blade 10 includes a leading edge 12 and a trailing edge 14. The blade 10 is attached at its root end 15 to a helicopter hub H and rotated in conjunction therewith about a rotational axis. The blade 10 includes a tip end 16 which is located at the radially outermost point on the blade. The tip end 16 may include a tip cap 17. At least one flap 18 is mounted to the trailing edge 14 of the blade 10 so as to be articulatable with respect to the trailing edge 14. As shown, the flap 18 may be located within a recess in the trailing edge 14. Alternatively, the flap 18 may be located aft of the trailing edge 14 and extend all or partway along the length of the trailing edge 14. Moreover, there may be several flaps 18 mounted to the rotor blade 10 that can be articulated either independently or concurrently for controlling blade vortex interactions or vibrations.

Figure 2:
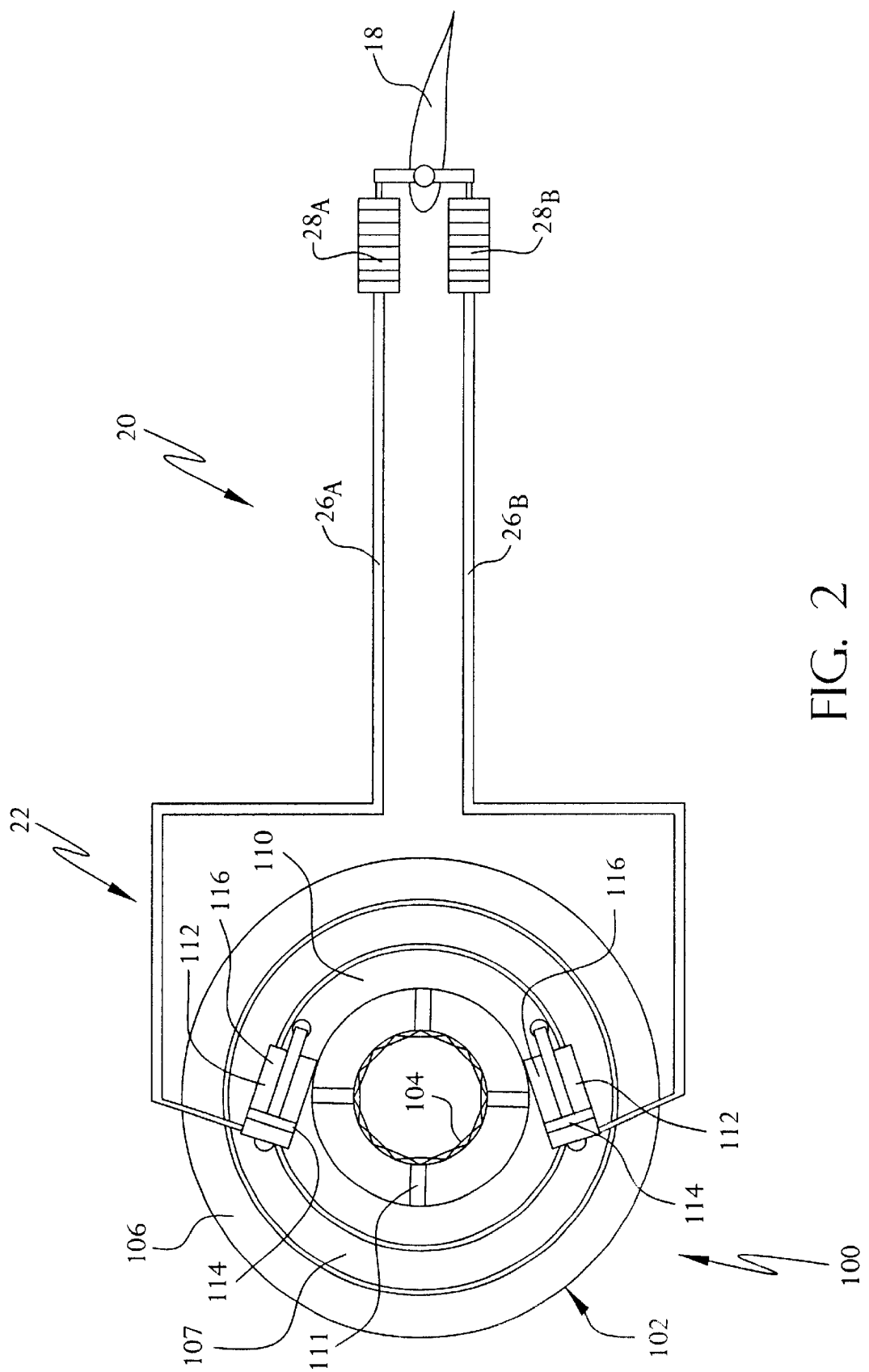
FIG. 2 is a schematic representation of one embodiment of an actuation system for actuating a flap on a rotor blade.

Referring now to FIG. 2, a schematic view of a hub mounted actuation system for controlling the pivoting of the flap 18 is shown. As discussed above, there have recently been several attempts made at designing an actuation system for controlling flaps on rotor blades. The present invention provides an actuation system that can be used to control flap motion in any rotor system operating at about 2/rev to about 6/rev. Actuation, however, is not limited to this frequency range nor a sinusoidal excitation. Actuation requirements would be dependent on the specific application system and the capabilities of the control software and hardware. One of the design constraints addressed by the present invention is the ability to provide flap angular position and frequency control as needed during flight. In order to accomplish this, the system must be designed to produce sufficient force to counter both aerodynamic and inertial loads.

Furthermore, the actuation system must be capable of providing a sufficient amount of force to overcome the air loads acting on the flap during normal flight (i.e. when the flap is being held motionless relative to the blade). For example, in a Mach-scale model actuation system that was tested, the design constraints required flap angular position control of about ±10° and frequencies up to approximately 125 cycles/second (Hz), which was 5/rev for the rotor under test. For a full scale rotor blade a 5/rev input would be approximately 20 Hz since a full scale rotor rotates at a slower speed.

In order to meet these design requirements, a hub mounted actuation system with fluid linkages to on-blade flap actuators is preferred. While a pneumatic linkage system could be used, it is not preferred since air is compressible. Fluid, e.g., hydraulic, is preferred since its compressibility is low and, thus, provides better control over flap motion. Fluid of higher modulus may yield further benefits provided the additional centrifugally induced pressures do not exceed on blade component capabilities. Other types of systems, such as those disclosed in the prior art, were considered but were determined not to be sufficient for use in a full scale rotor system. For example, although an electromechanical actuator, such as a piezoelectric actuator, could be used to control flap motion, the current devices available on the market would not directly provide a sufficient amount of deflection (e.g., ±10°) for controlling the flaps. In order to provide sufficient deflection, complex amplitude magnification devices would be required, resulting in a very large and heavy component. Thus, electromechanical and mechanical actuators are not considered suitable in the present invention.

The preferred actuation system 20 includes a fluid supply system 22 which supplies pressurized fluid to fluid actuators. The fluid supply system 22 will be discussed in more detail below. Preferably one fluid supply system 22 provides pressurized fluid medium separately to the actuation system 20 located in each blade 10. For a four bladed helicopter, four separate fluid supply systems 22 would be utilized. The fluid supply system 22 is co-located within the rotor hub H and has components which rotate in conjunction with the rotor blades 10. supply line 26. The supply line 26 acts as a conduit for the pressurized fluid. In a more preferred embodiment, there are two fluid supply lines $26_A$, $26_B$ one supply line $26_B$ provides fluid for actuating the flap upward and the second supply line $26_A$ provides fluid for actuating the flap downward.

The fluid supply lines $26_A$, $26_B$ extend outward through the rotor blade from the root end 15 toward the tip end 16. The fluid supply lines $26_A$, $26_B$ channel the fluid medium to one or more actuators $28_A$, $28_B$ which control actuation of the flaps. A suitable hydraulic system 20, including fluid supply lines $26_A$, $26_B$ is described in more detail in co-pending application entitled "Actuation System for an Active Rotor Control System" Ser. No. 09/293,428, and is incorporated herein by reference in its entirety.

Referring now to FIG. 2 which illustrates one preferred embodiment of a fluid supply or actuation system 22 according to the present invention. In this embodiment, the fluid supply system 22 is a permanent magnet motor fluid supply system 100. The permanent magnet motor fluid supply system 100 includes a permanent magnet motor 102 that is mounted around the main rotor shaft 104 of the helicopter. The permanent magnet motor 102 includes a fixed outer support or ring 106 that has one or more stators mounted to it. An intermediate ring 107 is mounted adjacent to the outer ring 106 and rotates with respect to it. The intermediate ring 107 is supported by an inner support or ring 110 which, in turn, is attached to the main rotor shaft 104 through a frame 111. The inner ring 110 rotates at the same speed as the main rotor shaft 104. As will be discussed in more detail below, the intermediate ring 107 is capable of rotational movement relative to the inner ring 110. A plurality of actuators 112 are disposed between the intermediate ring 107 and the inner ring 110. For the sake of simplicity, these actuators 112 are referred to herein as hub actuators. The hub actuators 112 are designed to convert differential rotary motion between the intermediate ring 107 and the inner ring 110 into fluid displacement which is then used to provide blade control, e.g., flap deflection. It should be readily apparent that while the illustrated embodiments are described as including ring shaped members, other shaped components can be substituted therefor without detracting from the scope of the invention. For example in the embodiment illustrated in FIGS. 4 and 5, the intermediate ring 107 is actually in the shape of a substantially flat annular disk. A suitable fluid actuating system 100, including hub actuators 112, is described in more detail in co-pending application entitled "Permanent Magnet Phase-Control Motor"Ser. No. 09/634, 554, filed concurrently with the instant application, and is incorporated herein by reference in its entirety.

Each hub actuator 112 has a moveable member 114, such as a piston, which is slidingly disposed within a housing 116. As shown in FIG. 2, the movable members or pistons 114 and housings 116 are attached to the intermediate ring 107 and the inner ring 110 such that when rotation of the intermediate ring 107 in one direction causes one hub actuator 112 to compress, the other hub actuator 112 extends (i.e., decompresses). For example, FIG. 2 shows the housings 116 for the hub actuators 112 attached to the intermediate ring 107 and the pistons 114 attached to the inner ring 110. In this embodiment, differential rotation of the intermediate ring 107 with respect to the inner ring 110 in the clockwise direction will produce pressurization of the fluid within fluid line $26_A$ and decompression of the fluid within fluid line $26_B$. While the illustrated embodiment shows the one hub actuator 112 attached to each fluid supply line 26, it should be readily apparent that there may be more than one actuator depending on the pressure that is needed, load sharing requirements and geometry, i.e., space constraints, etc.

Figure 3:
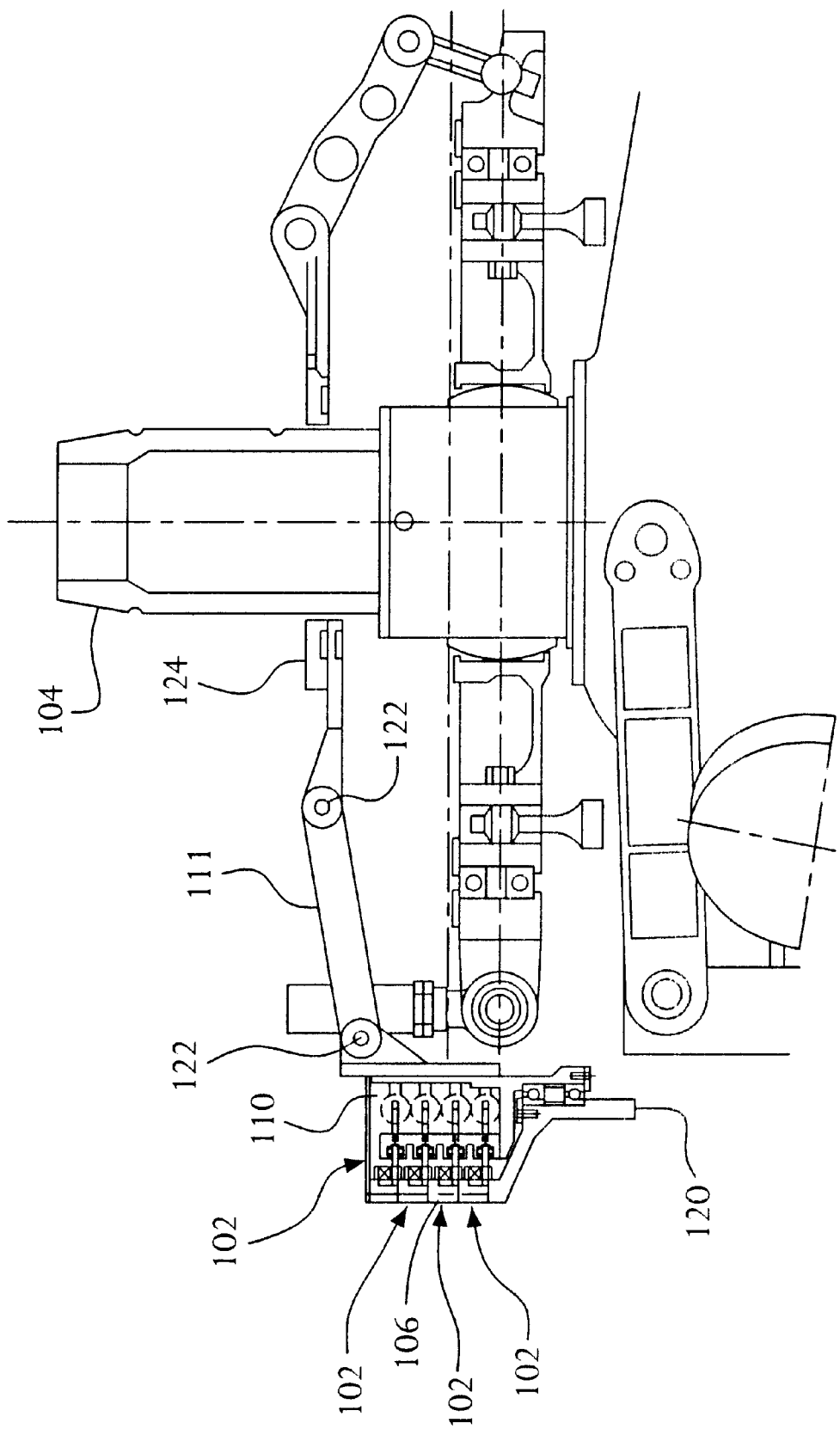
FIG. 3 is side view of one embodiment of a hub mounted actuation system according to the present invention.
Figure 4:
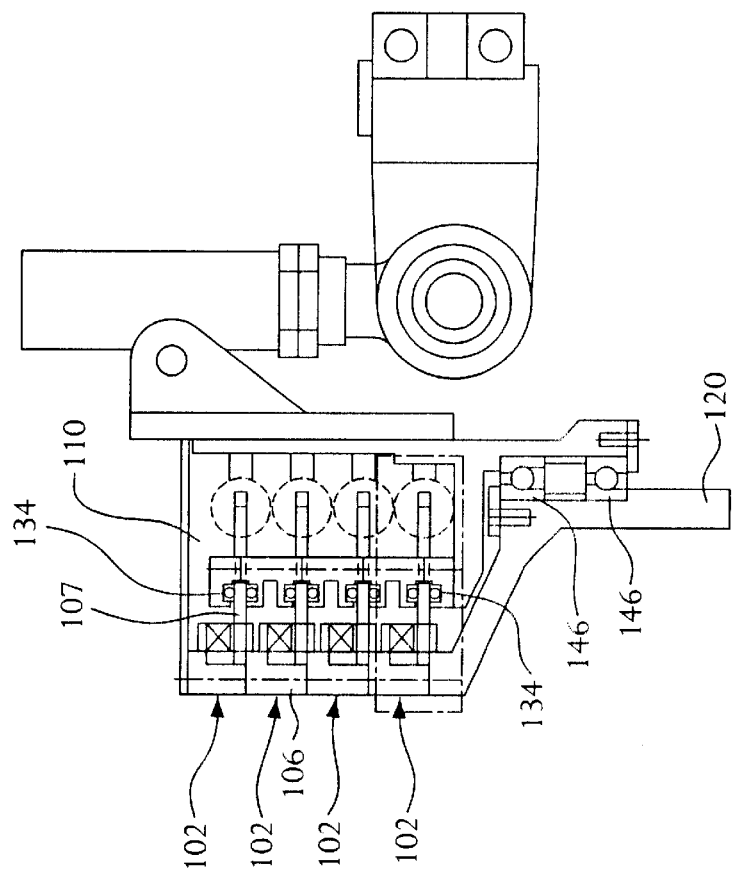
FIG. 4 is an enlargement of a stack of permanent magnet motors that can be used to provide blade control.

Referring to FIGS. 3 and 4, a side view of one embodiment of the invention is shown in more detail. In the illustrated embodiment, there are four permanent magnet motors 102 stacked upon one another. Each permanent magnetic motor 102 operates independently from the others and is connected to one rotor blade. For simplicity, only one permanent magnet motor 102 will be described in this specification. The outer ring 106 of the permanent magnet motor 102 is attached to a fixed airframe support 120, such as the top of the gearbox. The inner ring 110 is attached to the rotor shaft by the frame 111. The frame 111 is designed to transmit torsional (rotary) motion from the rotor shaft 104 to the inner ring 110. However, since the rotor shaft 104 is subject to vibratory motions, it is desirable that the frame 111 is attached so that it does not transmit vibrations or any other deflections to the inner ring 110 in the other axes. In the embodiment illustrated in FIGS. 3 and 4, the frame 111 is a scissor linkage which directly transmits rotary motion from the main rotor shaft 104 to the inner ring 110. One end of the scissor linkage 111 is attached to a pressure plate 124 which is mounted on the main rotor shaft. The other end is attached to a fitting on the inner ring 110. The scissor linkage 111 includes at least two pinned connections 122 that allow the scissors to accommodate vertical and radial movement of the main rotor shaft 104 with respect to the inner ring 110.

Figure 7:
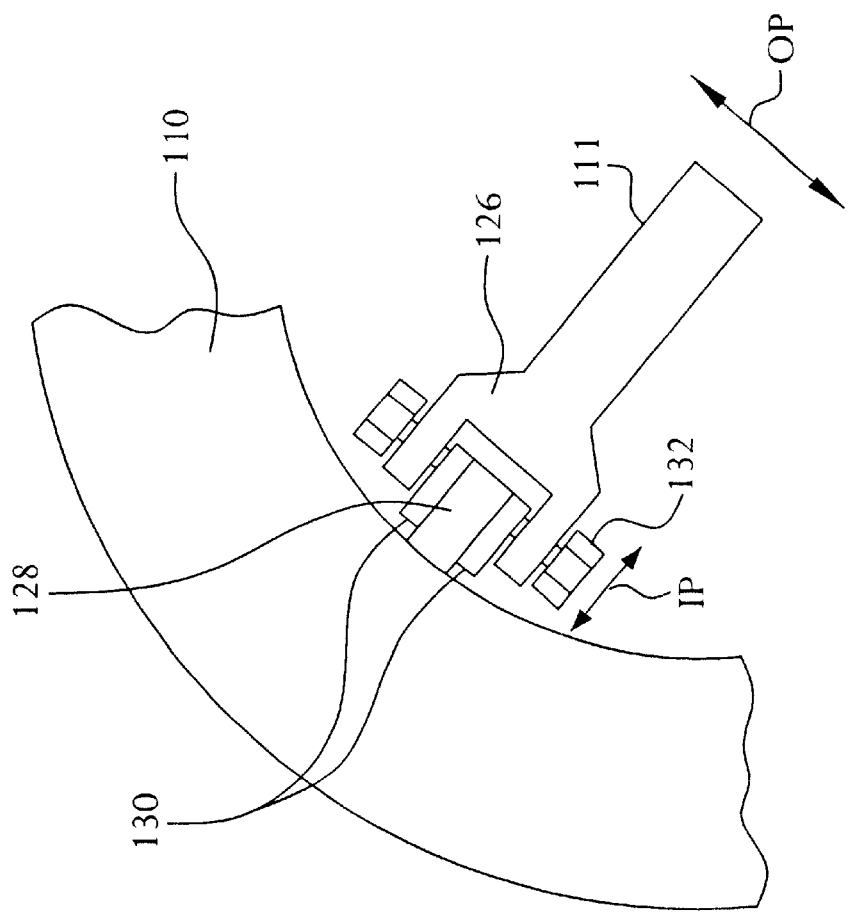
FIG. 7 is a top view of the attachment of a support to the rotating inner ring in one embodiment of the invention.

In another, more preferred, embodiment of the invention shown in FIG. 7, the frame 111 is a strut which is fixedly attached to the main rotor shaft 104. The strut 111 includes a clevis end 126 that attaches to a fitting 128 formed on the inner ring 110. Preferably a resilient attachment is used to secure the clevis end 126 and the fitting 128. More particularly, two elastomeric shims 130 are disposed between the clevis end 1 26 and the fitting 128. Elastomeric elements are well known in the art and generally comprise alternating layers of elastomer and non-resilient shims. A bolt or similar fastener 132 attaches the strut 111 to the fitting 128. The elastomeric shims 130 have low stiffness in-plane (identified by the arrows labeled IP) to permit radial and vertical motion of the strut 111, but have high stiffness out-of-plane (identified by the arrows OP) to transmit circumferential or rotary motion from the strut. More preferably, the elastomeric shim has an in-plane stiffness less than about 10,000 lb./in, and an out-of-plane stiffness greater than about 100,000 lb./in.

While the strut 111 is described in the above embodiments as permitting limited motion at the attachment to the inner ring 110, it is also contemplated that the strut 111 can be fixed to the inner ring 110 with the attachment of the strut 111 to the rotor hub being designed to permit limited deflections for preventing transmission of vibratory loads.

As discussed above, the intermediate ring 107 is rotatably driven by the rotor shaft 104, yet capable of being differentially rotated with respect to the inner ring 110 through the application of current to the fixed portion of the magnetic circuit, the stator 142 in FIG. 5 and as described below. This differential motion is used to drive the flap actuation system 20 using the hub actuators 112. More particularly, and with reference to FIGS. 4 and 5, the intermediate ring 107 is mounted to a bearing 134 within the inner ring 110 that allows the intermediate ring 107 to move rotationally relative to the inner ring 110. In the illustrated embodiment, the bearing includes upper and lower low speed ball or roller bearings 134 that are designed to inhibit vertical motion of the intermediate ring 107 with respect to the inner ring 110, while permit the intermediate ring 107 to move circumferentially or in-plane relative to the inner ring 110. In a scale-model embodiment of the invention which was built and successfully tested, a low profile, 4-point contact bearing from Kaydon Corporation, Muskegon, Mich., was used. A full-scale system would require a larger bearing.

The intermediate ring 107 includes a radially outer portion 136 and a radially inner portion 138. The inner portion 138 is attached to the actuator 112. More particularly and with reference to FIGS. 2 and 5, the inner portion 138 of the intermediate ring 107 is attached to the housing 116 of the actuator 112. It should be readily apparent that the inner portion 138 of the intermediate ring can be attached to the piston 114 instead.

The outer portion 136 of the intermediate ring 107 include a plurality of rare-earth magnets 140 that are spaced apart from one another around the circumference of the intermediate ring 107. The arrangement of the magnets can more readily be seen in FIG. 6. The magnets are preferably about 0.23 inches in width, 0.475 inches in length and are spaced apart approximately 0.20 inches. The magnets are preferably neodymium iron boron, sold by Magnetic Applications, Horsham, Pa. The magnets 140 are mounted to the disk such that the poles on adjacent magnets alternate.

Figure 5:
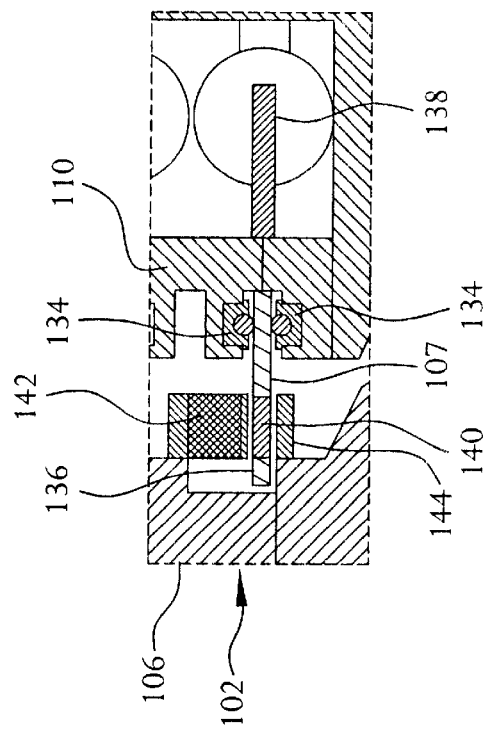
FIG. 5 is a detailed cross-sectional view of one of the permanent magnet motors of FIG. 4.

As shown in FIG. 5, the magnets 140 are located between a stator 142 and a return 144, both mounted on the outer ring 106. The stator 142 is preferably located above the magnets 140 and is formed from wire wound on an iron core. The return is located below the magnets 140 on the intermediate ring 107 and comprises helically-wound silicon iron tape. One hundred seventy six stators were used in the permanent magnet motor used in the scale model. There would be approximately six hundred stators in a full-scale permanent magnet phase control motor. The stator 142 and return 144 are preferably made from silicon-iron material or a copper-cobalt material sold under the trade name HYPERCO, which has high magnetic flux capabilities. HYPERCO is sold by Carpenter Technology Corporation, Reading, Pa.

The stator 142 and return 144 are spaced apart from the intermediate ring 107 to allow it to move freely. The intermediate ring 107 preferably has sufficient structural strength so that it does not deflect when subjected to a magnetic force toward or away from the stator 142.

Referring back to FIG. 4, high speed bearings 146 are used to mount the fixed components adjacent to the rotating components. In a scale version of the present invention, a duplex bearing set, with two-directional bearings (an angular-contact type bearing mounted on top and capable of handling thrust loads in one direction as well as radial loads, and a radial-contact bearing mounted on the bottom and capable of handling loads in only the radial direction) was used. The duplex pair provided support in the vertical direction, while the single radial contact bearing provided support for the moment loads. As shown, there are preferably two roller bearings 146 located between the inner ring 110 and the outer ring 106 or the fixed support 120. The two bearings 146 can both be located on the same side of the permanent magnet motor 102 as shown, or one can be located above and the other below the motor 102 to prevent potential twisting moments on the permanent magnet motor 102.

The operation of the permanent magnet motor drive system 22 will now be discussed. During normal operation, the rotation of the rotor shaft 104 is transmitted to the inner ring 110 through the frame 111, thus causing the intermediate ring 107 to rotate at the same speed as the main rotor shaft 104. Rotational torque, generated by speeding up or slowing down the intermediate ring 107 through current supplied to the stators 142, is transmitted through the hub actuators 112 to the flap actuation system 20. The outer ring 106 is fixed to the airframe 120 and, therefore, does not move. The intermediate ring 107 nominally rotates with the inner ring 110. When there is no current supplied to the stator 142, the intermediate ring 107 rotates at the same speed as the rotor shaft 104. When the inner ring 110 and intermediate ring 107 rotate at the same speed, the hub actuators 112 are not extended or compressed and, therefore, no differential pressure is supplied along the supply lines $26_A$, $26_B$.

Figure 8B:
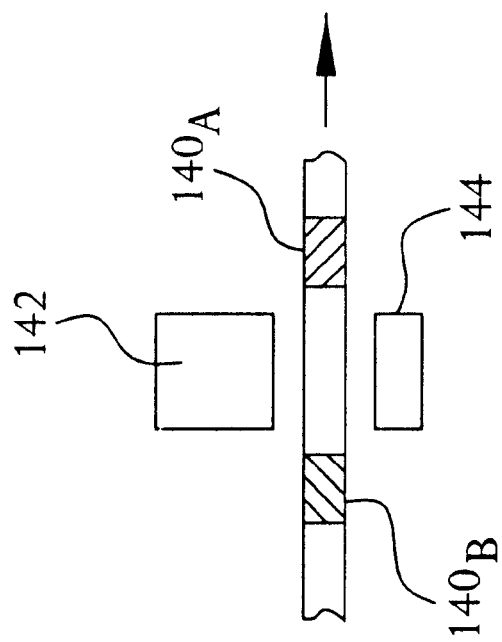
FIG. 8A–8B illustrate the operation of a permanent magnet motor for driving an intermediate ring.
Figure 8A:
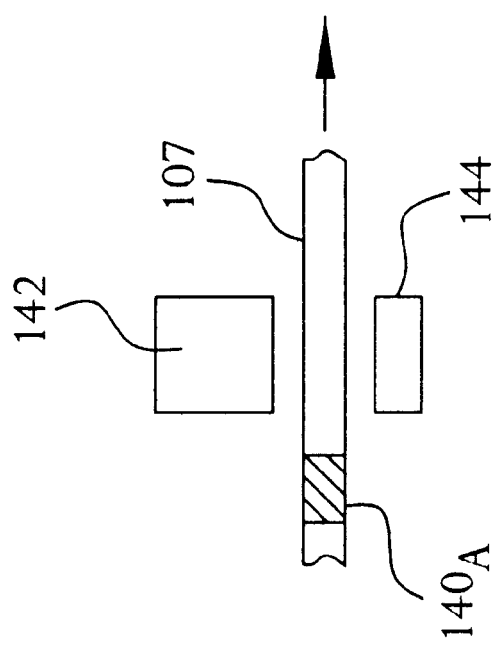

In order to supply pressurized fluid to the supply lines $26_A$, $26_B$, current is applied to the stator 142, generating a magnetic field. Referring to FIGS. 8A and 8B which is a schematic representation of the operation of the magnetic drive, the magnetic field of the stator attracts a magnet $140_A$ on the intermediate ring 107 toward the stator 142 and return 144. As the magnet 140 passes the stator 142 and return 144, the direction of the current to the stator 142 is reversed, causing the magnetic field to repel the magnet $140_A$ away, while at the same time attracting the next, oppositely poled magnet $140_B$, toward the magnetic field. The result is that the magnetic field forces the intermediate ring 107 to move in-plane.

By applying alternate currents to the stator 142 at a frequency that is faster (or slower) than the rotational speed of the main rotor shaft 104 and the inner ring 110, the intermediate ring 107 can be advanced (or retarded) with respect to the inner ring 110 in a vibratory manner. The differential rotary motion between the intermediate ring 107 and the inner ring 110 produces a change in hydraulic pressure within the hub actuators 112 attached to the intermediate ring 107. More particularly, as the intermediate ring 107 rotates relative to the inner ring 110, the pistons 114 within the hub actuators 112 slide within their respective housings 116, resulting in one hub actuator 112 supplying pressurized hydraulic pressure along one fluid supply line (e.g., $26_A$). The other hub actuator 112 is subject to a lower pressure which draws hydraulic fluid out of the other fluid supply line (e.g., $26_B$). The hydraulic system is statically pressurized. The differential pressure between the two fluid lines provides the flap motion. This pressurized fluid can be utilized to control pitch changes of the flap on the rotor blade. Since each permanent magnet motor 102 can be separately controlled, supply of pressurized fluid can be tailored to each blade as needed.

Although the present invention has been described as supplying pressurized fluid to a rotor blade for actuating a flap, the invention can also be used for supplying pressurized fluid in any system that includes a rotating shaft. For example, the pressurized hydraulic fluid can be used to control the pitch of the entire rotor blade (referred to as individual blade control (IBC)).

Figure 9:
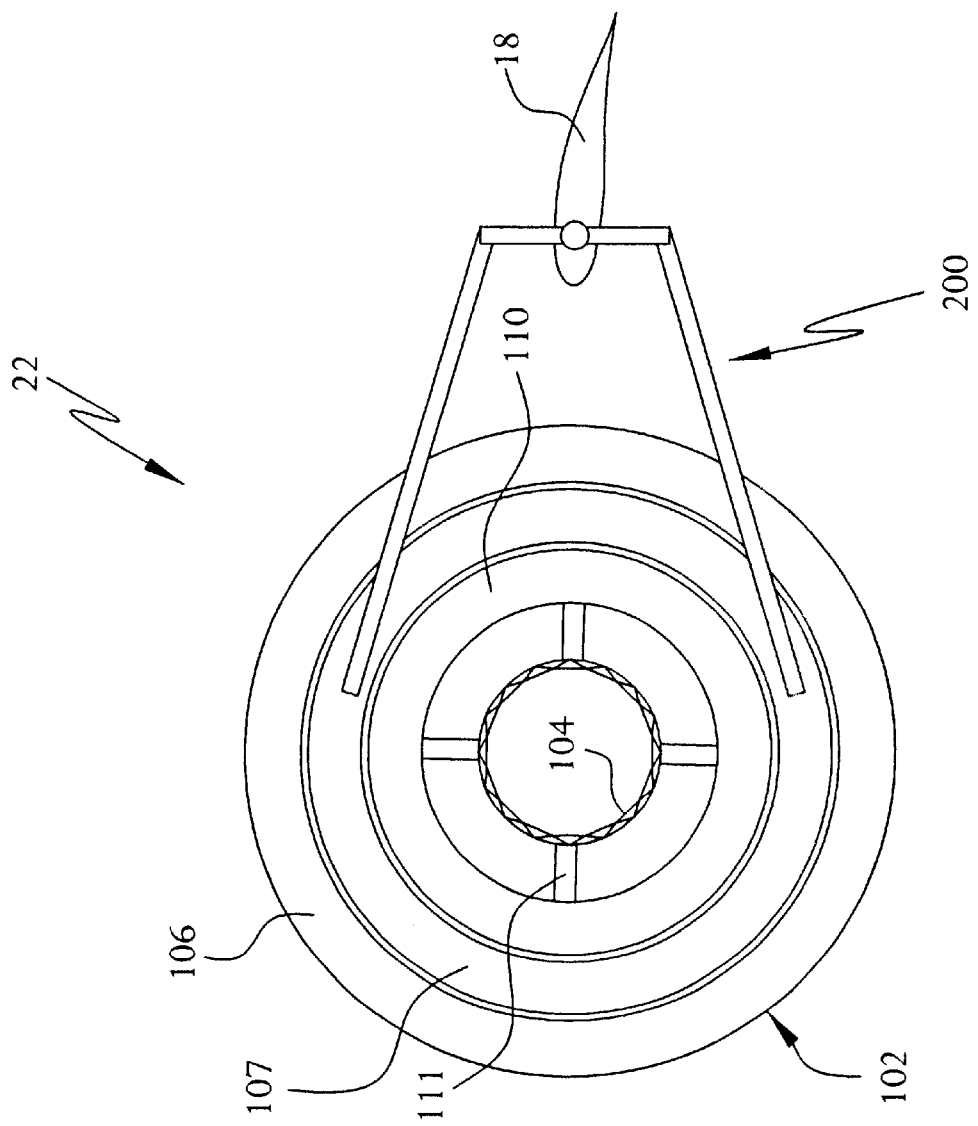
FIG. 9 is a schematic representation of an embodiment of the hub mounted actuation system that incorporates a mechanical linkage for actuating a flap on a rotor blade.

It is also contemplated that the fluid linkage system described above that is located between the blade and the permanent magnet motor 102 (i. e., fluid supply lines $26_A$, $26_B$ and blade actuators $28_A$, $28_B$) can be replaced with a mechanical linkage system that connects the component being moved (e.g., the rotor blade or the blade flap) directly to the intermediate ring 107. In this embodiment, which is schematically depicted in FIG. 9, differential rotary motion of the intermediate ring 107 displaces one or more linkages 200 that produce the desired blade or flap change. Those skilled in the art would readily be capable of configuring a suitable linkage system for use in the present invention.

Figure 13:
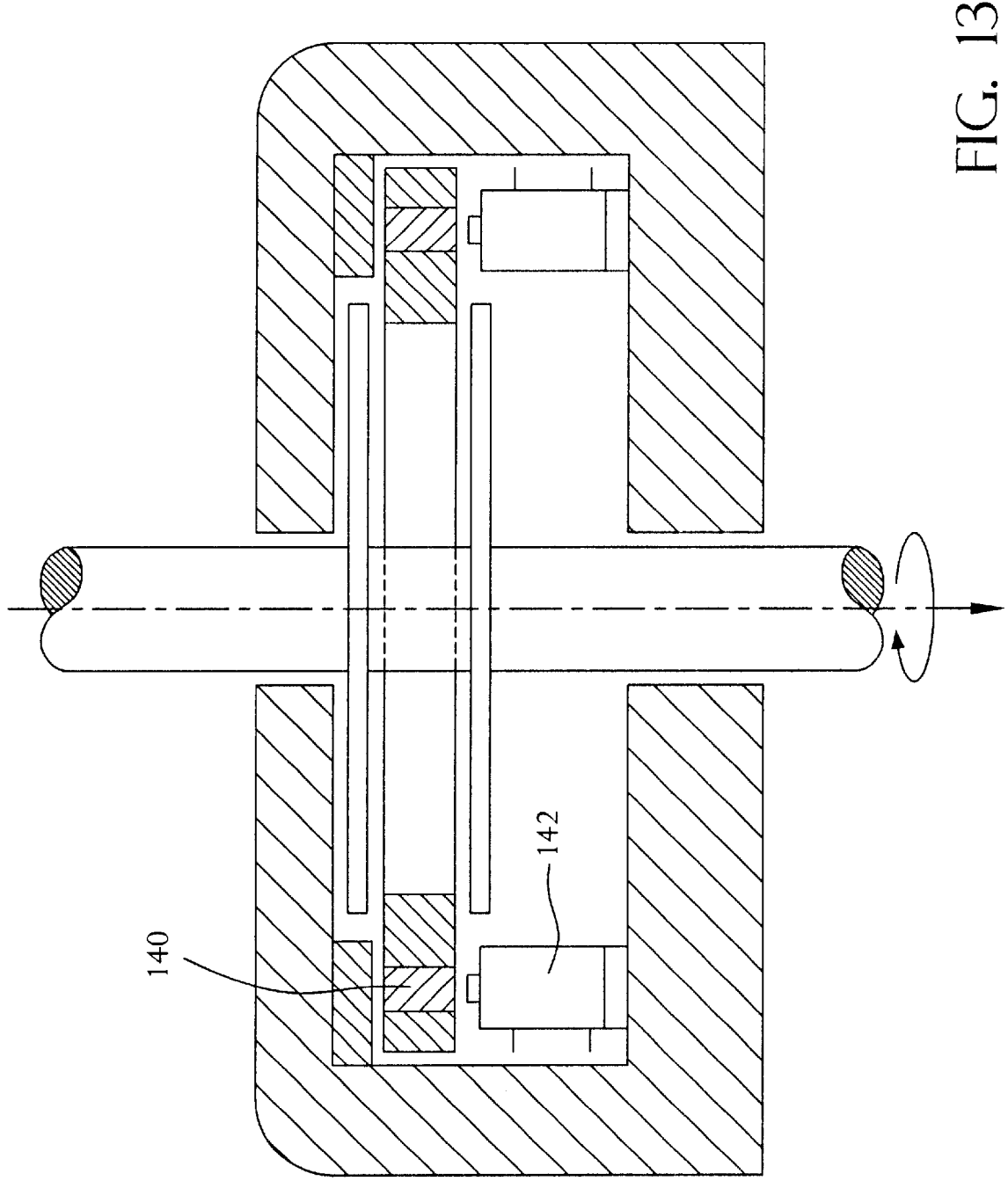
FIG. 13 is a schematic cross-sectional view of another embodiment of the permanent magnet motor according to the present invention.

An alternate arrangement, which may be preferred under certain circumstance, for the permanent magnet motor 102 is shown in FIG. 13. In this embodiment, the stator 142 is mounted below the magnet 140, and the return 144 is mounted above. The details of FIG. 13 are described in co-pending application entitled "Permanent Magnet Phase-Control Motor" filed on even date Ser. No. 09/752,180, and are incorporated herein by reference in their entirety.

Figure 10:
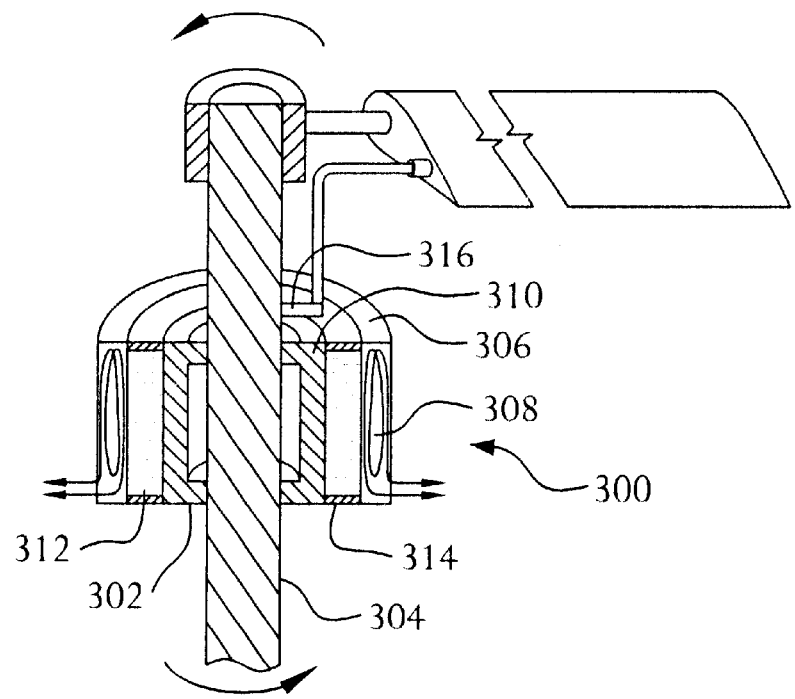
FIG. 10 is a schematic cross-sectional view of an alternate embodiment of the hub mounted actuation system illustrating the use of a magneto rheological fluid.

While a permanent magnet motor has been discussed above as the mechanism for controlling the actuation of the hub mounted actuator 112, other devices may be substituted into the overall system. For example, referring to FIG. 10, an alternate embodiment 300 of the invention is shown which utilizes a magneto Theological fluid to control the actuator. More particularly, a rotating collar 302 is rotatably disposed about the main rotor shaft 304. A stationary magnetic collar 306 is mounted around and radially outward from the rotating collar 302. A coil 308 is mounted to or within the stationary collar 306 and electrically connected to a controller (not shown) which is preferably an on-board processor, such as the flight control computer.

An intermediate ring 310 is reciprocatably engaged with the inner rotating collar 302, such as by a spring (not shown). The reciprocatable engagement between the intermediate ring 310 and the rotating collar 302 results in the intermediate ring 310 rotating with the rotating collar 302, but with relative rates of rotation that can vary.

A magneto rheological fluid 312 is contained in a chamber separating at least the intermediate ring 310 and the stationary collar 306. Magneto Theological fluids are known and generally comprise a fluid which contains metallic particles. When the magneto rheological fluid 312 is subjected to a magnetic field, the metallic particles change the drag force that the fluid 312 imposes on the intermediate ring 310. High speed seals 314 prevent leakage of the magneto rheological fluid 312 from between the intermediate ring 310 and the stationary collar 306. One suitable magneto rheological fluid is sold by Lord Corporation, Cary, N.C.

A hub mounted actuator 316 is attached to the rotating collar 302 a and intermediate ring 310 in a similar manner as discussed above in the first embodiment. The hub mounted actuator supplies pressurized fluid to control the blade flap.

During operation, rotation of the main rotor shaft 304 causes the rotating collar 302 to rotate. When no magnetic force is supplied to the system 300, the magneto rheological fluid 312 imposes little drag on the intermediate ring 310. As such, the intermediate ring 310 rotates with the rotating collar 302 and no pressure is transmitted from the hub mounted actuator 316 to the blade flap.

When it is desired to change the pitch of the blade flap, an electrical current is sent to the coil 308. The magnetic field that is generated by the coil 308 increases the drag that the magneto Theological fluid 312 imposes on the intermediate ring 310. This results in the intermediate ring 310 moving with respect to the rotating collar 302. The relative movement of the intermediate ring 310 and the rotating ring 302 generates a pressure change in the hub mounted actuator 316 which, in turn, produces flap motion.

When it is desired to return the flap to its original position, the magnetic field is removed. The spring force or returning force of the reciprocatable engagement between the rotating collar 302 and the intermediate ring 310 forces the intermediate ring 310 to return to its initial position and to, once again, rotate with the rotating collar 302. To obtain two-way motion, a bias can be introduced via several ways, including a steady magnetic flux or additional springs, for example.

Figure 11:
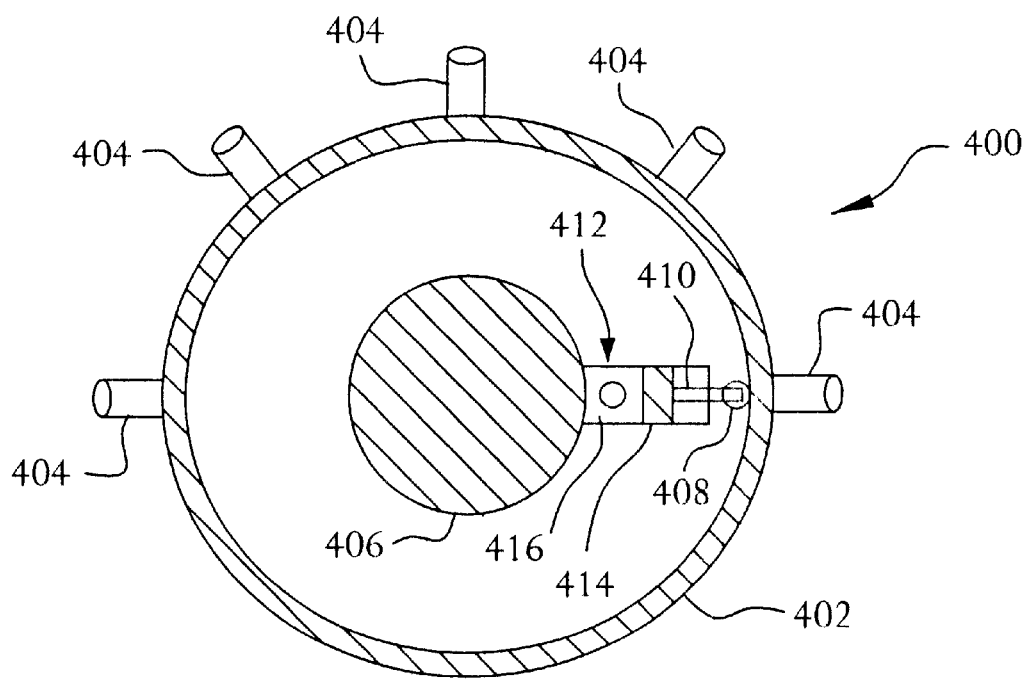
FIG. 11 is a schematic cross-sectional view of another embodiment of the hub mounted actuation system illustrating the use of a deformable cam.

Another embodiment of the invention 400 is shown in FIG. 11. In this embodiment, a deformable cam surface 402 is mounted to the airframe via stiff cam actuators 404. The cam actuators 404 are controlled by a processor for changing the shape of the deformable cam surface 402. The deformable cam surface 402 is disposed about the main rotor shaft 406. A cam follower 408 is attached to a piston shaft 410 of a hub mounted actuator 412. The piston shaft 410 is attached to a piston 414 which moved within a chamber in a actuator housing 416. The housing 416 is mounted to the main rotor shaft 406. A fluid line (not shown) connects the hub mounted actuator 412 to the blade flap as described in the first embodiment of the invention.

As the main rotor shaft 406 rotates, it drives the hub mounted actuator 412 around the rotor shaft's axis. The cam follower 408 rolls along the inner contour of the deformable cam 402. The processor is programmed to control the cam actuators 404 to deform the deformable cam 402 into a desired profile. As the cam follower 408 rolls over a portion of the inner contour that is not at a constant radial distance from the main rotor shaft 406, the pressure within the chamber of the hub actuator 412 changes, either pressurizing or depressurizing the fluid line.

Figure 12:
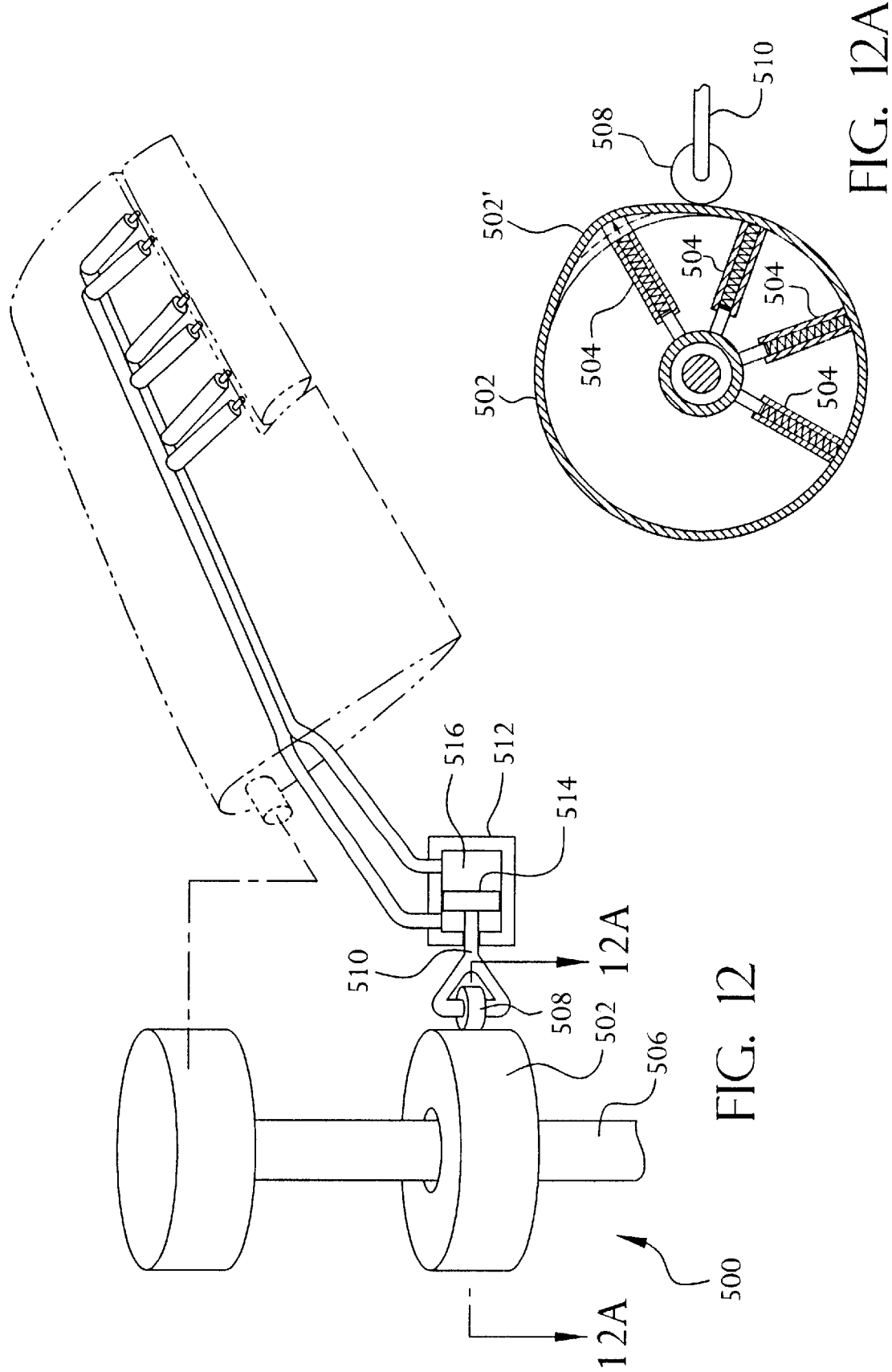

FIGS. 12 and 12A show a variation on the cam actuation system in FIG. 11. In this embodiment 500, the deformable cam 502 is again fixedly mounted to the airframe around the main rotor shaft 506. Cam actuators 504 are attached to the airframe and mounted within the deformable cam 502 (FIG. 12A). The cam actuators 504 are attached to a processor which controls extension and retraction of the actuators 504, thereby changing the outer contour 502 of the deformable cam 502. A cam follower 508 is in rollable contact with the outer contour of the deformable cam 502. The cam follower is attached to a piston shaft 510 which controls displacement of a piston 514 within a hub mounted actuator 512. The movement of the piston changes the pressure of the fluid contained within a chamber 516 in the hub actuator 512, thereby controlling pressurization of the fluid line in similar manner as described above.

The present invention provides a novel way of transferring energy into the rotating system, without the need for auxiliary systems to power the actuation system. Instead, the present invention is powered by the rotation of the rotor shaft. Also, the system eliminates the need for hydraulic or electrical slip rings. The fixed-rotating gap in the present invention is bridged magnetically or mechanically, depending on the type of actuation system utilized. Additionally, since the actuators are mounted at the hub, the present invention overcomes the vibratory and centrifugal problems associated with blade mounted systems.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A hub mounted actuation system for providing control of a rotor blade on a rotorcraft, the rotor blade being attached to a rotor shaft that rotates with respect to an airframe, the system comprising:

a stationary support mounted to the airframe;

a rotary support attached to the rotor shaft for concomitant rotation therewith;

at least one hub actuator with a piston and a housing, the piston being slidable within the housing, the piston and housing defining a pressure chamber within the at least one actuator which contains a fluid to be pressurized, the at least one hub actuator rotating in combination with the rotor blade;

displacement control means disposed between the stationary support and the rotary support for controlling movement of the piston within the housing, a portion of the displacement control means being attached to the stationary support and a portion being attached to the at least one hub actuator; and a linkage attached to a portion of the blade and at least one actuator, the linkage adapted to displace the blade portion as a function of the movement of the piston within the housing.

2. A hub mounted actuation system according to claim 1 wherein the displacement control means includes a stator mounted to the stationary support and an intermediate member supported by and rotatable relative to the rotary support, one of either the piston or the housing being attached to the intermediate member and the other being attached to the rotary support, the intermediate member having a plurality of magnets spaced around its circumference adjacent to the stator on the stationary support such that when current is supplied to the stator a magnetic field is created that causes the intermediate member to rotate relative to the rotary support, the rotation of the intermediate member relative to the rotary support causing the piston to move within the housing.

3. A hub mounted actuation system according to claim 2 wherein there are at least two hub actuators, and wherein relative motion of the intermediate member with respect to the rotary support produces differential pressurization between one hub actuator and the other hub actuator.

4. A hub mounted actuation system according to claim 1 wherein the linkage is a hydraulic fluid linkage.

5. A hub mounted actuation system according to claim 1 wherein the displacement control means includes a deformable cam mounted between the stationary support and the rotary support, the deformable cam being supported by cam actuators mounted to the stationary support, the cam actuators adapted to deform the cam according to a predetermined schedule, and a cam follower in rolling contact with the deformable cam and attached to the piston of the hub actuator, and wherein as the cam follower rolls around the cam the deformation of the cam causes the piston to move within the housing of the hub actuator.

6. A hub mounted actuation system according to claim 1 wherein the rotary support is attached to the rotor shaft by a strut, the strut being resiliently attached at least at one end to minimize the transmission of vibrations from the rotor shaft to the rotating support.

7. A hub mounted actuation system according to claim 6 wherein the resilient attachment includes an elastomeric element.

8. A hub mounted actuation system according to claim 1 wherein the rotary support is attached to the rotor shaft by a scissor linkage, the scissor linkage being pivotally attached at one end to the rotary support and at the other end to a bracket on the rotor shaft.

9. A hub mounted actuation system according to claim 1 wherein the displacement control means includes a coil mounted to the stationary support and an intermediate member supported by and rotatable relative to the rotary support, one of either the piston or the housing being attached to the intermediate member and the other being attached to the rotary support; a magneto rheological fluid is disposed within a chamber separating the intermediate member from the stationary support, the magneto rheological fluid imposing a drag force on the intermediate member which is greater when a current is supplied to the coil than when no current is supplied, the drag causing the intermediate member to rotate relative to the rotary support and thereby causing the piston to move within the housing.

10. A hub mounted actuation system providing control of a rotor blade on a rotorcraft, the rotor blade being attached to a rotor shaft that rotates with respect to an airframe, the system comprising:

a stationary member mounted to the airframe, the stationary member having at least one stator formed on at least a portion of it;

a rotary member attached to the rotor shaft and located adjacent to the stationary member;

an intermediate member rotatable with respect to the stationary member, the intermediate member being supported by the rotary member, the intermediate member having a plurality of magnets spaced around its circumference adjacent to the stator on the stationary member such that when current is supplied to the stator on the stationary member a magnetic field is created that causes the intermediate member to move with respect to the rotary member;

at least one actuator with a piston and a housing, the piston being slidable within the housing, the piston and housing defining a pressure chamber within the at least one actuator which contains a fluid to be pressurized, one of either the piston or the housing being attached to the rotary member and the other being attached to the intermediate member such that movement of the intermediate member with respect to the rotary member causes the piston to slide within the housing; and a linkage attached to a portion of the blade and the at least one actuator, the linkage adapted to displace the blade portion as a function of the movement of the piston within the housing.

11. A hub mounted actuation system according to claim 10 wherein the stationary, rotary and intermediate members are ring shaped.

12. A hub mounted actuation system according to claim 10 wherein there are at least two actuators, and wherein relative motion of the intermediate member with respect to the rotary member produces differential pressurization between one actuator and the other actuator.

13. A hub mounted actuation system according to claim 10 wherein the linkage is a fluid linkage that includes a fluid line connected to at least one actuator, and a blade actuator attached to the blade portion, the fluid line adapted to supply pressurized fluid to the blade actuator for deflecting the blade portion.

14. A hub mounted actuation system according to claim 10 wherein the fluid contained within the fluid linkage is hydraulic fluid.

15. A hub mounted actuation system according to claim 10 wherein the rotary support is attached to the rotor shaft by a strut, the strut being resiliently attached at least at one end to minimize the transmission of vibrations from the rotor shaft to the rotating support.

16. A hub mounted actuation system according to claim 15 wherein the resilient attachment includes an elastomeric element.

17. A hub mounted actuation system providing control of a rotor blade on a rotorcraft, the rotor blade being attached to a rotor shaft that rotates with respect to an airframe, the system comprising:

a stationary support mounted to the airframe, the stationary support having a stator attached to it;

a rotary support engaged with the rotor shaft adjacent to the stationary support;

an intermediate disk rotatable with respect to the stationary support, the intermediate disk being slidingly mounted to the rotary support such that the intermediate disk can move in-plane relative to the rotary support, the intermediate disk having a plurality of magnets spaced around its circumference adjacent to the stator such that each adjacent magnet is oppositely poled, the intermediate disk adapted to move relative to the rotary support when current is supplied to the stator which creates a magnetic field adjacent to the magnets;

at least one actuator with a piston and a housing, the piston being slidable within the housing, the piston and housing defining a pressure chamber within the at least one actuator which contains a fluid to be pressurized, one of either the piston or the housing being attached to the rotary support and the other being attached to the intermediate disk such that movement of the intermediate disk with respect to the rotary support causes the piston to slide within the housing; and a linkage attached to a portion of the blade and the at least one actuator, the linkage adapted to displace the blade portion as a function of the motion of the piston within the housing.

* * * * *